USOO5737799A

United States Patent [19]
Maubray et al.

[11] Patent Number: 5,737,799
[45] Date of Patent: Apr. 14, 1998

[54] SCREEN WIPING APPARATUS INCLUDING A DEFLECTOR MOUNTED FOR DEFORMATION ON A BLADE HAVING A FLEXIBLE WIPING STRIP

[75] Inventors: Daniel Maubray, Issy les Moulineaux; Corinne Soucheyre, St. Babel, both of France

[73] Assignee: Valeo Systemes d'Essuyage, La Verriere, France

[21] Appl. No.: 506,083

[22] Filed: Jul. 24, 1995

[30] Foreign Application Priority Data

Jul. 25, 1994 [FR] France ................... 94 09172

[51] Int. Cl.⁶ .................................... B60S 1/38
[52] U.S. Cl. .................. 15/250.201; 15/250.04; 15/250.46; 15/250.44
[58] Field of Search .............. 15/250.201, 250.351, 15/250.48, 250.44, 250.451, 250.43, 250.361, 250.46

[56] References Cited

U.S. PATENT DOCUMENTS

| | | | |
|---|---|---|---|
| 5,138,739 | 8/1992 | Maubray | 15/250.201 |
| 5,206,969 | 5/1993 | Patterson et al. | 15/250.201 |
| 5,218,735 | 6/1993 | Maubray | 15/250.201 |
| 5,283,925 | 2/1994 | Maubray | 15/250.201 |

FOREIGN PATENT DOCUMENTS

| | | |
|---|---|---|
| 0 410 854 | 1/1991 | European Pat. Off. . |
| 0 419 328 | 3/1991 | European Pat. Off. . |
| 0 429 334 | 5/1991 | European Pat. Off. . |
| 2630070 | 10/1989 | France ................ 15/250.46 |
| 2106775 | 4/1983 | United Kingdom . |
| 2145928 | 4/1985 | United Kingdom .......... 15/250.201 |
| 2146891 | 5/1985 | United Kingdom .......... 15/250.201 |

*Primary Examiner*—Gary K. Graham
*Attorney, Agent, or Firm*—Morgan & Finnegan, LLP

[57] ABSTRACT

A screen wiper, in particular for a motor vehicle windshield, comprises: an elongate wiper blade having a flexible wiping strip for contact with a curved swept surface, the wiping strip being mounted on the blade in such a way that it can deform in one plane so as to follow the curvature of the swept surface; and an elongate flexible deflector which is so configured as to form a mask that tends to divert air streams so that, when the vehicle is travelling at high speeds, an aerodynamic force is exerted on the blade which tends to urge the flexible wiping strip into contact with the swept surface. The deflector is able to deform on the wiper blade, and its deformation is controlled by the flexible wiping strip itself. The wiper includes, in at least two points along the length of the wiper blade, means for transmitting to the deflector the deformation of the wiping strip, so that this latter deformation is reproduced in the deflector. The blade has first guide means, and the deflector has second guide means. These guide means are arranged to cooperate with each other in sliding movement in at least two points along the length of the wiper blade, so as to guide the deformation of the deflector.

19 Claims, 8 Drawing Sheets

FIG_1B

FIG_1A

FIG_1C

SCREEN WIPING APPARATUS INCLUDING A DEFLECTOR MOUNTED FOR DEFORMATION ON A BLADE HAVING A FLEXIBLE WIPING STRIP

FIELD OF THE INVENTION

The present invention relates to screen wiping apparatus, especially for motor vehicles, and the like. Such apparatus will also be referred to in this specification as a screen wiper or windshield wiper.

BACKGROUND OF THE INVENTION

A screen wiper conventionally comprises an elongate wiper blade which includes a flexible wiping strip that makes wiping contact with a surface to be swept, referred to generally in this specification as a "swept surface". The swept surface is typically, through not essentially, a windshield of the vehicle. The flexible wiping strip is mounted on the blade in such a way that it can become deformed in one plane, in such a way that it follows the contours, i.e. the curvature, of the swept surface and remains in contact with the latter at all times.

It is also known to equip a wiper blade with a deflector, which is so configured as to form a mask which tends to divert the flow of air streams when the vehicle is travelling, particularly at high speeds, in such a way as to cause the air stream to exert an aerodynamic force on the blade, such as to urge the flexible strip of the latter into contact with the windshield of the vehicle. For aerodynamic reasons, the free edge of the deflector has to be close to the surface of the windshield. However, it must not make contact with the latter, otherwise it will tend to leave dirty marks on the surface of the windshield, to the detriment of visibility for the driver of the vehicle.

French patent specification FR 2 650 235 has proposed that a flexible deflector should be mounted on the wiper blade in such a way that the deflector is deformable. Its deformation is controlled by the flexible strip of the blade, in such a way as to maintain it close to the surface of the windshield while at the same time avoiding the possibility of the deflector making actual contact with the swept surface where the latter has a sharp curvature. To this end, the flexible deflector is fixed on to the blade at two articulating points. The known screen wiping apparatus disclosed in the above mentioned French patent specification is however not entirely satisfactory, in particular because the articulations consist of rivets, which are liable to become corroded and to give rise to undesirable noise during operation after having been in use for some time. The deflector also tends to deform upstream with respect to the air streams, and therefore away from the flexible strip of the blade, and this gives rise to poor wiping quality.

The same publication also proposed the use of a deflector which was no longer flexible but was instead rigid, being mounted for straight line movement on the wiper blade by means of two oblong holes which were adapted to move on two pins carried by the blade. In that known screen wiping apparatus, problems arise in which the deflector is often prevented from moving when it is displaced asymmetrically with respect to a central plane of the wiper blade, this being due to the pins becoming jammed in the oblong holes.

DISCUSSION OF THE INVENTION

An object of the present invention is to propose an improved screen wiping apparatus, especially for a motor vehicle, which overcomes the drawbacks of known types of screen wiping apparatus.

According to the invention, a screen wiping apparatus for a vehicle, especially a motor vehicle, comprising:

- an elongate wiper blade incorporating a flexible wiping strip for making contact with a curved swept surface, the flexible wiping strip being mounted on the wiper blade for deformation of the wiping strip in one plane so as to follow the curvature of the swept surface, and
- an elongate flexible deflector, which is so configured as to exert, at high travelling speeds of the vehicle, an aerodynamic force which tends to urge the flexible wiping strip on to the swept surface, the deflector being mounted for deformation of the latter on the wiper blade, and its deformation being controlled by the flexible wiping strip,
- is characterized in that the apparatus includes, in at least two points along the length of the wiper blade, means for transmitting to the deflector the deformation of the flexible wiping strip, in such a way that the deflector accompanies (i.e. reproduces) the deformation of the flexible wiping strip, the wiper blade being provided with first guide means, and the deflector with second guide means, the second guide means being arranged to cooperate in relative sliding movement with the first guide means in at least two points along the length of the wiper blade, and preferably in at least three of the points, to guide the deflector in its deformation.

Preferably, this guidance takes place in a plane which is preferably a plane substantially parallel to the plane in which the flexible wiping strip deforms.

The deflector preferably includes an armature, having a longitudinal edge on which a profiled element of the deflector is preferably moulded (or, in a modification, attached), the profiled element being preferably of an elastomeric material the means for transmitting deformation from the flexible wiping strip to the deflector comprising a set of lugs, which are preferably made integrally with the armature of the deflector (or, in a modification, the lugs are attached on the armature), the lugs being so configured as to be displaceable by the flexible wiping strip.

The flexible wiping strip is preferably carried by at least two secondary yokes, which are articulated to a main yoke about pivot axes at right angles to the plane of deformation of the flexible wiping strip.

The flexible wiping strip is preferably carried by four of these secondary yokes, which are articulated, each at its centre, to the longitudinal ends of two intermediate yokes, which are themselves articulated, each at its centre, to the longitudinal ends of the main yoke.

In a first embodiment of the invention, the screen wiping apparatus includes guide lugs which are made integrally with articulating members carried on the longitudinal ends of at least one yoke, with these guide lugs extending laterally towards the deflector so as to define the first guide means.

In a second embodiment of the invention, the screen wiping apparatus includes inserts having an upper portion for engagement on a pivot pin by which two yokes are articulated together, together with a lower portion which extends laterally towards the deflector, so as to define the first guide means.

In a third embodiment of the invention, in which the secondary yokes are provided at their longitudinal ends with claws for holding the flexible wiping strip, these claws have at least one portion which extends laterally towards the deflector so as to define the first guide means.

In a fourth embodiment of the invention, the screen wiping apparatus includes guide lugs carried by the flexible wiping strip, with these guide lugs extending laterally towards the deflector so as to define the first guide means. These guide lugs are preferably carried by arch elements, each of which is attached on the flexible wiping strip, adjacent to a transmission lug which transmits the deformation of the flexible wiping strip to the deflector.

In a fifth embodiment of the invention, in which each yoke has two wing elements extending in facing relationship to each other and joined together by a spine portion of the yoke which lies generally at right angles to the wing elements, at least one yoke has at least one tongue which is formed integrally with one of its wing elements, and which is bent back at right angles so as to define the first guide means.

In the five embodiments described above, the screen wiping apparatus preferably includes guide fingers which project from the armature of the deflector, and which extend transversely to the longitudinal direction of the latter so as to define the second guide means. Preferably, the guide fingers are flat and are oriented parallel to the plane in which the flexible wiping strip deforms. In a modification, the guide fingers are oriented in a plane which defines a constant angle with the plane in which the flexible wiping strip deforms. Preferably, the screen wiping apparatus includes at least one opening formed in a guide lug, for receiving a guide finger, for relative sliding movement between the guide finger and guide lug.

In a sixth embodiment of the invention, the first guide means are made integrally with a guide plate of plastics material, which is attached on the blade and which extends generally parallel to the plane in which the flexible wiping strip deforms. These first guide means may consist of oblong holes formed in the guide plate, in which guide pegs or pins carried by the armature of the deflector are displaceable, with these guide pegs extending parallel to the main pivot axis of the wiper blade, that is to say the axis on which the blade pivots on the associated screen wiper arm in the known way.

In a further modification, the first guide means may consist of recesses formed within the thickness of the guide plate, with guide fingers carried by the armature of the deflector being displaceable in these recesses, the guide fingers being generally flat and perpendicular to the main axis mentioned above.

The guide plate applied on the wiper blade preferably incorporates means for supporting at least one screen washing nozzle for directing screen washing liquid on to the swept surface.

Further features and advantages of the present invention will appear more clearly on a reading of the detailed description of preferred embodiments of the invention which follows, and which is given by way of non-limiting example only and with reference to the accompanying drawings.

DESCRIPTION OF PREFERRED EMBODIMENTS OF THE INVENTION

The drawings show a number of different embodiments of a screen wiper blade in accordance with the present invention. The blades themselves, bearing the reference numerals 1, 101, 201, 301, 401, 501 and 601 in the various FIGS., are equipped with flexible deflectors bearing reference numerals 22, 122, 222, 322, 422, 522 and 622 respectively. Each of these deflectors comprises a profiled element of a suitable elastomeric material which is mounted on to an armature, the latter being of a more rigid material. Although the armature is rigid, it nevertheless allows the deflector to become deformed by flexing. The blades incorporate a flexible wiping strip which is carried by an articulated mounting system. This mounting system, or support structure, is so arranged that the wiping strip can deform in one plane, to follow the variations in the curvature of the swept surface.

The blades are arranged to be mounted pivotally about a main pivot axis A at the end of a screen wiper arm. The wiper arm is of any suitable known type and is not shown in the drawings, and it is arranged to be driven in alternating rotary movement in the usual way. Each wiper blade shown in the drawings has an elongate form, which is symmetrical with respect to a central plane which contains the axis A and which lies at right angles to the longitudinal direction of the blade.

In the remainder of this description, and in the claims, the terms "lower", "upper", "bottom" and "top", or equivalent terms will be used, purely for convenience, to describe the blade in terms of the blade being in one particular orientation in which it rests, through its flexible wiping strip, on a flat horizontal surface, so that the axis A is then itself horizontal.

Figures 1A, 1B, 1C:
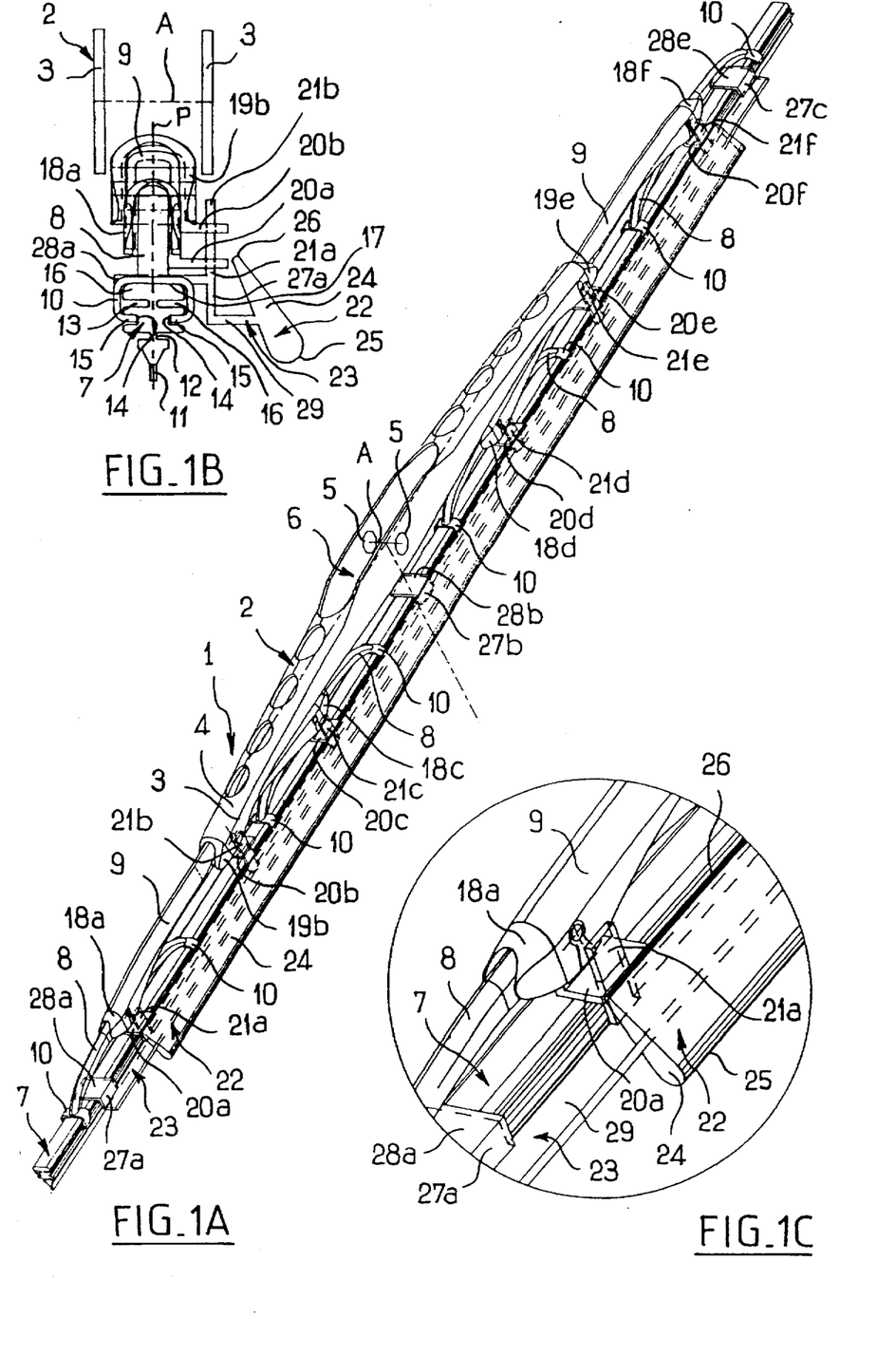
FIG. 1A is a perspective view of a screen wiper blade in a first embodiment of the invention.
FIG. 1B is a view of the blade shown in FIG. 1A, viewed endwise, i.e. in the longitudinal direction, and showing, in projection in a transverse plane, the relative positioning of various elements constituting the blade.
FIG. 1C shows, on a larger scale, certain details of the construction of the blade seen in FIGS. 1A and 1B.

Reference is first made to FIG. 1A, in which the blade 1 comprises an elongate main yoke 2, having two lateral wing elements 3 extending in facing relationship to each other and joined at the top through a back or spine portion 4, which lies generally at right angles to the wing elements. The main yoke 2 has a U-shaped transverse cross section which is open downwardly. The wing elements 3 are pierced at 5 in the central region of the main yoke 2, for fastening a pivot pin (not shown) which acts as the pivot at the junction, on the main pivot axis A, whereby the blade 1 and the screen wiper arm are coupled together. The spine portion 4 has a through aperture 6 in the central region of the main yoke 2. A gripping element (not shown), carried by the screen wiper arm, extends through the aperture 6 to engage elastically from above on the above mentioned pivot pin.

The flexible wiping strip of the blade 1, for wiping in contact with the swept surface, such as the windshield of a vehicle, is indicated at 7. The flexible strip 7 is carried by the blade 1 in such a way that it is able to deform in a plane at right angles to the axis A, so as always to follow the curvature of the windshield, regardless of the angular position of the screen wiper arm. More precisely, the flexible wiping strip 7 is carried by four secondary yokes 8, which are themselves carried by two intermediate yokes 9 suspended from the main yoke 2. Each of the intermediate yokes 9 is articulated at the centre about an axis of rotation parallel to the axis A, at one longitudinal end of the main yoke 2 and between the wing portions 3 of the latter. Each secondary yoke 8 is articulated at its centre, about an axis of rotation parallel to the axis A, at a longitudinal end of one intermediate yoke 9, between the wing portions of the latter. Each of the intermediate yokes 9 and secondary yokes 8 has, when seen from the side, i.e. in the direction of the axis A, a generally downwardly arcuate form. In cross section in a plane parallel to the central plane, each yoke 9 and 8 has a downwardly open U-shaped transverse cross section. The secondary yokes 8 are provided with claws 10 at their longitudinal ends. These claws 10 straddle the flexible wiping strip 7 from above, so as to grip its sides.

The flexible wiping strip 7 is metrical with respect to a plane P which is at right angles to the axis A. As can be seen more particularly in FIG. 1B, the strip 7 comprises a wiping lip 11 in its lower part, tapered towards its lower edge and adapted to make contact with the swept surface. The lip 11 is connected at the top, through an integral bridge portion that constitutes a hinge 12, to a grooved base element 13 of the wiping strip 7. The base element 13 has two grooves 14. The claws 10 have lower edges 15 which are bent inwardly towards each other and which are engaged in the grooves 14. Two further grooves 16, deeper than the grooves 14 and located above the latter, are arranged to receive, in a manner known per se, a bar, which is generally of stainless steel, for stiffening the flexible wiping strip 7. At the top, the base element 13 is bounded by a generally flat back surface 17 which is parallel to the axis A. The flexible wiping strip 7 is retained by the claws 10 at eight points, which are spaced apart over its length at fairly regular intervals. The strip 7 is able to deform in a plane at right angles to the axis A so as to follow the variations in the curvature of the windshield, by virtue of the pivoting movement of the secondary yokes 8 and intermediate yokes 9 about their axes, mentioned above, parallel to the axis A.

In the example here described and shown in FIGS. 1A to 1C, the articulation of the secondary yokes 8 on the intermediate yokes 9 is obtained by means of articulating members 18a, 18c, 18d and 18f respectively, which are attached on the appropriate intermediate yokes 9. Similarly, the intermediate yokes 9 are articulated on the main yoke 2 by means of articulating members 19b and 19e, which are attached on the main yoke 2. These various articulating members are preferably made of a suitable plastics material. They then have the advantage, when the yokes are made of metal, of avoiding any direct metal to metal contact which can be a source of noise.

Each articulating member is engaged at one longitudinal end of a yoke between the wing elements of the latter. It can be held in place after it has been inserted between the wing elements of the yoke, by bending back one or more of the tongues which are formed integrally with the wing portions, or integrally with the spine portion of the yoke. It is also possible to provide each articulating member with elastic retaining means, such as one or more resilient tongues, which are adapted to be deformed elastically during insertion between the wing elements of the yoke. At the end of this insertion operation, the elastic retaining means engage in one or more retaining openings formed on the yoke. It is useful in this connection to refer to French published patent specification FR 2 630 070, which describes such elastic retaining means. Each articulating member has surfaces in facing relationship with each other, from which there project two walls defined by cylinders of revolution, so as to serve as a pivot, with an axis parallel to the main axis A, for the articulation of a yoke engaged between them. A pivot pin is preferably engaged in these cylindrical walls, as will be described more precisely below with reference to FIGS. 2B and 2C.

The flexible deflector 22 of the wiper blade t is arranged on the side of the latter which lies upstream of the flexible wiping strip 7 in the direction of flow of air streams over the windshield.

In this first embodiment of the invention, each articulating member has a guide lug, which is preferably made by mounting integrally with it, and which extends towards the deflector 22. Each of these guide lugs has a recess for the guidance, in sliding movement in the recess, of a guide finger which is fixed with respect to the deflector 22. Each guide lug extends generally at right angles to the central plane of the wiper blade 1, and parallel to the axis A. In FIG. 1A, the guide lugs carry the reference numerals 20a, 20b, 20c, 20d, 20e and 20f in the order in which they lie, going from one longitudinal end of the wiper blade 1. The guide lugs 20a, 20c, and the guide lugs 20d and 20f, are respectively carried by the articulating members 18a, 18c, 18d and 18f carried on the intermediate yokes 9, so as to serve as a pivot for the secondary yokes 8. The guide lugs 20b and 20e are carried by the articulating members 19b and 19e carried on the main yoke 2, so as to provide pivots for the intermediate yokes 9.

The guide fingers of the deflector 22, traversing the openings in the guide lugs 20a, 20b, 20c, 20d, 20e and 20f, have the reference numerals 21a, 21b, 21c, 21d, 21e and 21f respectively.

The deflector 22 has an armature 23, which is preferably of a suitable rigid plastics material, and which extends generally parallel to the flexible wiping strip 7 over the greater part of the latter. The armature 23 has a main portion 29 which is flat when the wiper blade lies on a flat surface, and which extends parallel to the main axis A. A profiled element 24 of the deflector 22, preferably of a suitable elastomeric material, is moulded on to a longitudinal edge of the main portion 29 of the armature.

In a modification, the profiled element 24 is a separate component, attached by any appropriate fastening means on the main portion of the armature 23.

The profiled element 24 is so configured as to constitute a mask which tends to divert the air stream so that, when the vehicle is travelling at high speed, the air stream will exert an aerodynamic force which tends to maintain the flexible wiping strip 7 in contact with the windshield. In transverse cross section, the profiled element 24 has a rounded lower edge 25, which lies close to the swept surface and which is extended downstream, that is to say in the direction of flow of the air relative to the wiper, by a portion which extends obliquely upwardly, becoming thinner towards the top and terminating in a rounded upper edge 26. The main portion 29 of the armature 23 meets the profiled element 24 approximately halfway along the latter. It extends in the axial direction slightly beyond the longitudinal ends of the profiled element 24, as can be seen in FIG. 1A.

Upright portions 27a, 27b, 27c, made integrally by moulding with the armature 23, are joined perpendicularly at their lower ends, as can best be seen in FIG. 1B, on to that surface of the main portion 29 that faces away from the swept surface. These upright portions lie along the longitudinal edge of the latter directed away from the profiled element 24. The upright portions 27a, 27b, 27c are extended at the top, at a right angle and away from the profiled element 24, by transmission lugs which transmit the deformation of the flexible strip 7 to the deflector 22. In the example shown in FIG. 1, three of these transmission lugs, 28a, 28b and 28e, are formed respectively at the longitudinal ends of the main portion 29 and at its centre. These transmission lugs are flat, and they extend parallel to the main portion 29 of the armature. The depth of the upright portions 27a, 27b and 27c is so chosen that, when the wiper blade 1 lies on a flat surface, the surfaces of the lugs that face towards that flat surface tend to intersect the back surface 17 of the base element 13 of the flexible wiping strip 7, as is evident from FIG. 1B. They are accordingly displaceable by the strip 7.

The deflector 22 is therefore caused to be deformed, in this example in a plane at right angles to the axis A, by the flexible wiping strip 7 through the transmission lugs 28a, 28b and 28e. The guide fingers 21a to 21f are made integrally by moulding with the armature 23, and are joined to the main portion 29 of the latter along that one of its longitudinal edges which faces away from the profiled element 24. The guide fingers have a rectangular transverse profile, in a cross sectional plane parallel to the axis A and at right angles to the central plane of the wiper blade. This rectangular profile defines a long side parallel to the longitudinal direction of the blade. The six guide fingers 21a to 21f of the deflector 22 are arranged in groups of three between the transmission lugs 28a, 28b and between the transmission lugs 28b and 28e.

When the screen wiper is in operation, as the curvature of the swept surface increases, the middle region of the flexible strip 7 rises above its end regions. The transmission lug 28b lying in the middle region is lifted by the back surface 17 of the flexible wiping strip 7, and the guide fingers 21c and 21d closest to the transmission lug 28b enter into the openings in the guide lugs 20c and 20d. The guide fingers 21a and 21f which lie at the longitudinal ends of the deflector 22 tend to be displaced in an inverse movement. On the other hand, as the curvature of the flexible wiping strip 7 diminishes, the control fingers 21c and 21d which are nearest the centre of the blade tend to descend into the openings of the guide lugs 20c and 20d, while the control fingers 21a and 21f lying at the ends enter into the openings in the guide fingers 20a and 20f.

In this way, the deflector 22 is enabled to copy the deformations of the flexible wiping strip 7, without any risk of jamming or of any undesirable operating noise being generated. The resulting quality of the wiping action is thus ensured, even when the vehicle is travelling at high speeds, without any risk of direct contact of the deflector with the swept surface.

The remainder of this description is concerned with further embodiments of the invention. These incorporate elements which are identical with some of the elements which have already been described with reference to FIGS. 1A to 1C. The description of these identical elements will not be repeated, and in the remaining Figures they are given the same reference numerals. It will be understood that those passages of the present text given above and describing the said elements are to be taken as implied and incorporated in what now follows.

Figures 2A, 2B, 2C:
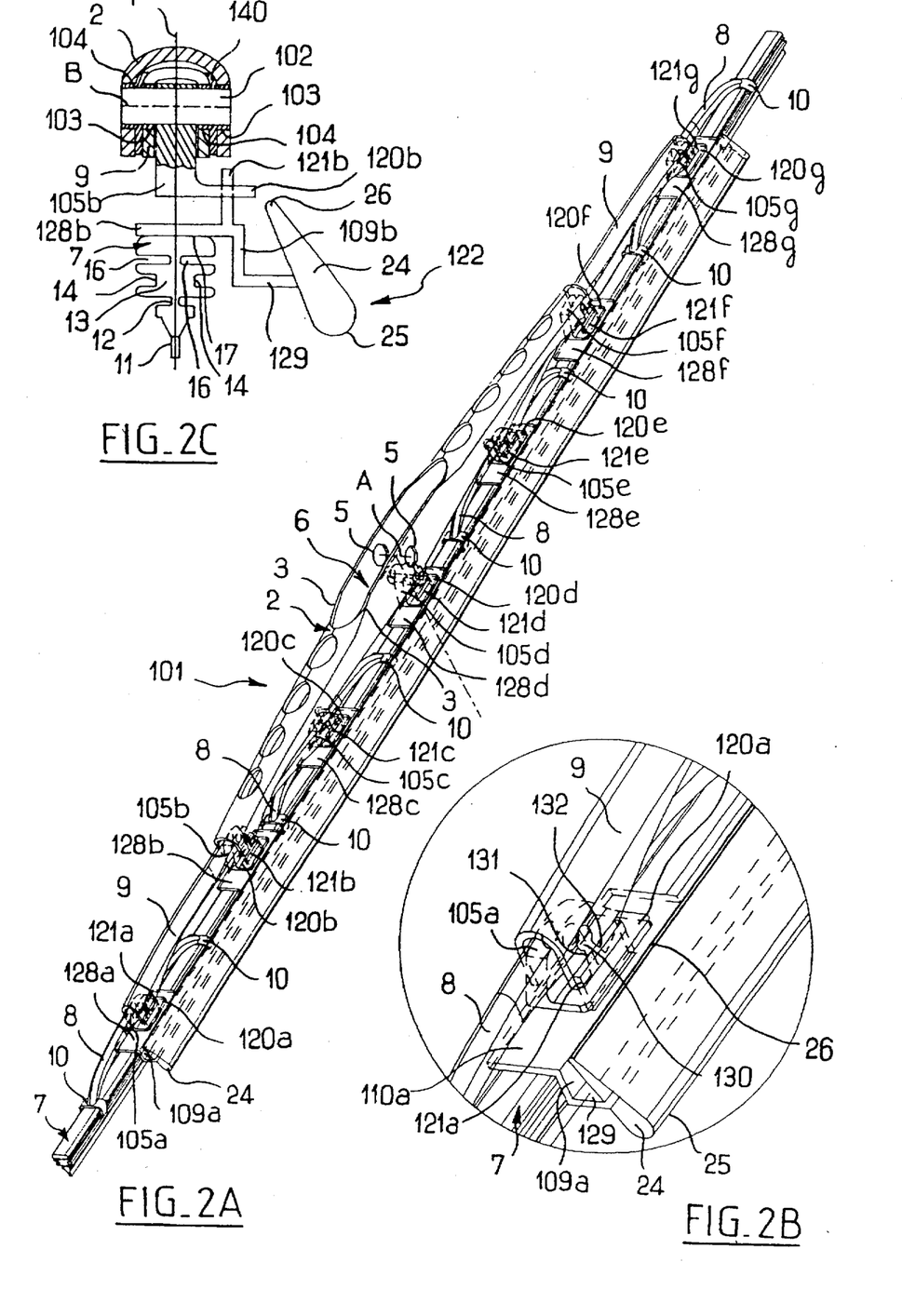
FIG. 2A is a perspective view of a screen wiper blade in a second embodiment of the invention.
FIG. 2B, on a larger scale, shows certain constructional details of the blade shown in FIG. 2A.
FIG. 2C is a view of the same blade as is shown in FIGS. 2A and 2B, viewed endwise and showing, in projection in a transverse plane, the relative positioning of various elements constituting the blade.

Reference is now made to FIGS. 2A to 2C, showing the second embodiment of the invention in which the screen wiper blade is given the reference numeral 101. Each intermediate yoke 9 is articulated at its centre on one longitudinal end of the main yoke 2, by means of an articulating member 140 and a pivot pin 102, which defines an axis B parallel to the main axis A (see FIG. 2C). More precisely, as shown in FIG. 2C, the articulating member 140 has walls 103 and 104 which are defined by cylinders of revolution about the axis B, and which are engaged in holes formed on the wing elements of the corresponding intermediate yoke 9 and the main yoke 2. The wall of the wing elements that defines the lower edges of these holes is preferably cut out so as to define openings to enable the articulating member 140 to be fitted in position. FIG. 2B shows, at 130, one of these openings in one of the intermediate yokes 9. The opening 130 has two edges 131 and 132 which are convergent upwardly towards the axis B, so as to facilitate introduction of the articulating member 140 from below.

Fitting of the secondary yokes 8 on the intermediate yokes 9 is carried out in a similar way to that by which the intermediate yokes 9 are fitted on the main yoke 2.

The deflector 122 of the wiper blade, shown in FIG. 2A, comprises a profiled element 24 which is preferably of a suitable elastomeric material, and which is moulded on to an armature 123 of a suitable rigid plastics material. The armature 123 has a main potation 129 which differs from the main portion 29 described with reference to FIG. 1 in that its length is the same as that of the profiled element 24.

In this second embodiment, inserts 105b, 105f, made by moulding in a plastics material, are inserted between the wing elements of the intermediate yokes 9. These inserts are extended laterally towards the deflector 122 so as to define guide lugs 120b and 120f respectively. Further inserts 105a, 105c, 105e and 105g, having guide lugs 120a, 120c, 120e and 120g respectively, are inserted between the wing elements of the secondary yokes 8 in the region of their articulation with an intermediate yoke 9. The pivot pins by which the secondary yokes 8 are articulated on the intermediate yokes 9 extend through the upper parts of the inserts 105a, 105c, 105e and 105g. Similarly, the pivot pins 102 between the intermediate yokes 9 and the main yoke 2 pass through the upper parts of the inserts 105b and 105f which are engaged between the wing elements of the intermediate yokes 9. A final insert, 105d, is engaged between the wing elements of the main yoke 2. The insert 105d is held in place, by contrast with the other inserts, by means of a cylindrical fastening element which does not provide articulation. This fastening element extends between the wing elements 3 of the main yoke 2, parallel to the main axis A and in the central plane of the wiper blade 101.

Each of the inserts mentioned above has an L-shaped cross section in a plane parallel to the central plane of the wiper blade, as is best seen in FIG. 2C, with the foot of the L constituting the corresponding guide lug.

The main portion 129 of the deflector 122 is provided, on its longitudinal edge facing away from the profiled element 24, with upright portions which extend at right angles to the axis A. These upright portions are joined to that surface of the main portion 129 which faces away from the swept surface, and in this example there are seven of these upright portions. They lie, respectively, over the length of the main portion 129, in the vicinity of the inserts 105a to 105g. Only those upright portions, having the reference numerals 109a and 109b, that lie respectively in the vicinity of the inserts 105a and 105b, are shown (in FIGS. 2B and 2C respectively). These upright portions are extended at the top, at right angles to and away from the profiled element 24, by transmission lugs which transmit the deformation of the flexible strip 7 to the deflector. These transmission lugs are given the respective reference numerals 110a to 110g, corresponding to the upright portions associated with the inserts 105a to 105g respectively.

The depth of the upright portions is so chosen that, when the wiper blade lies on a flat surface, the surfaces of the transmission lugs lying on the same side as that surface tend to intersect the back surface 17 of the flexible strip 7. Guide fingers 121a to 121g are carried respectively by the transmission lugs 110a to 110g. Each of these guide fingers is orientated at right angles to the plane of the associated transmission lug that carries it, and is joined to the latter close to the upright portion which joins it to the main portion 129. The guide lugs 120a to 120g of the inserts 105a to 105g respectively are formed with apertures for receiving the guide fingers 121a to 121g respectively. In this particular example, these latter have, in cross section in a plane at right angles to the central plane of the wiper blade and parallel to the main axis A, a rectangular profile having a major side parallel to the longitudinal direction of the wiper blade. The apertures in the guide lugs 120a to 120g of the inserts 105a to 105g have a complementary rectangular cross section.

The method of operation of the screen wiper blade 101 shown in FIGS. 2A to 2C is the same as that of the blade shown in FIGS. 1A to 1C. As the curvature of the windshield varies, the flexible strip 7 is deformed, and this, by means of the transmission lugs 110a to 110g, causes the deflector 122 to become deformed in a plane parallel to the plane of deformation of the flexible strip 7.

Because of the large number of guide points at which sliding movement can take place, the deflector 122 is constrained to become deformed in a plane parallel to the plane of deformation of the flexible strip 7. In this second embodiment, the locations of the transmission lugs 128a to 128g that transmit the deformation from the flexible strip 7 to the deflector 122 coincide with the locations of the points at which the deflector 122 is guided in sliding movement on the blade 101.

Figures 3A, 3B, 3C, 3D, 3E:
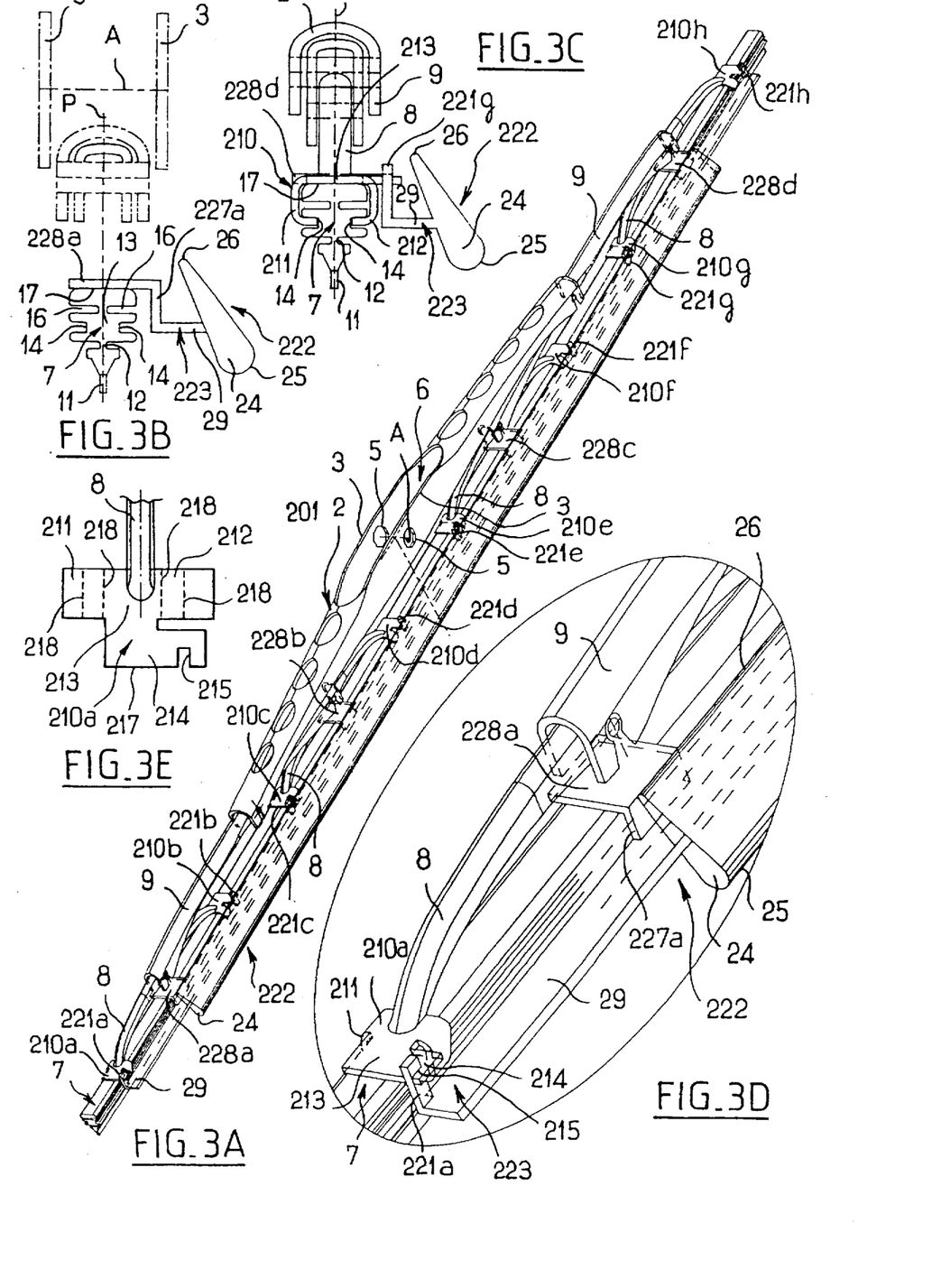
FIG. 3A is a perspective view of a screen wiper blade in a third embodiment of the invention.
FIGS. 3B and 3C are two views of the same blade as is shown in FIG. 3A, viewed endwise and showing, in projection in a transverse plane, the relative positioning of various elements constituting the blade.
FIG. 3D shows certain constructional details of the blade shown in FIGS. 3A to 3C.
FIG. 3E shows a retaining claw of the flexible wiping strip of the blade shown in FIGS. 3A to 3D, before the claw is reformed.

Reference is now made to FIGS. 3A to 3E. FIG. 3A shows in perspective the screen wiper blade 201 representing the third embodiment to be described here. The deflector 222 of this blade has, as in the foregoing embodiments, a rigid armature 223 which includes a main portion 29, with a profiled element 24 mounted in a suitable elastomeric material on a longitudinal edge of the main portion 29.

The deflector 222 is guided in sliding movement at eight points which are spaced apart over its length, by means of guide fingers with the respective reference numerals 221a, 221b, 221c, 221d, 221e, 221f, 221g and 221h, in the order in which they lie starting from one longitudinal end of the wiper blade 201. The guide fingers 221a to 221h are joined at right angles to the main portion 29 of the armature. In cross section in a plane at right angles to the central plane of the wiper blade 201 and parallel to the axis A, these guide fingers have a rectangular transverse profile, defining a major side parallel to the longitudinal direction of the wiper blade. They are guided in sliding movement in complementary rectangular apertures formed on respective claws 210a to 210h, for retaining the flexible wiping strip 7. The claws 210a to 210h lie at the longitudinal ends of the secondary yokes 8. Each claw has two lateral portions 211 and 212 which are bent back towards each other and which grip on the top the grooved base portion 13 of the flexible strip 7, for engagement in the grooves 14 of the latter. The lateral portions 211 and 212 are bent about bending fines 218 parallel to the longitudinal axis of the flexible strip 7, as is best seen in FIG. 3E. They are joined through a flat central portion 213 which constitutes the back of the claw. The central portion 213 is extended away from the yoke 8 that carries the claw, and then extends sideways in the same plane, towards the deflector 222, so as to define a guide lug 214. The guide lug 214 has, on its longitudinal edge 217 furthest away from the yoke 8, a rectangular notch 215 for receiving a corresponding one of the guide fingers of the deflector 222.

Four transmission lugs for transmitting the deformation of the flexible strip 7 to the deflector 222, and denoted by the reference numerals 228a, 228b, 228c and 228d, are frowned on the armature 223 of the deflector 222 in locations which lie, when the wiper blade 201 lies on the horizontal flat surface, in vertical alignment with the articulations of the respective secondary yokes 8 on the intermediate yokes 9. These transmission lugs 228a to 228d, which are generally perpendicular to the central plane of the wiper blade and parallel to its main axis A, are joined to the main portion 29 of the armature 223 by means of upright portions which lie at right angles to the axis A. In FIG. 3, only the upright portion 227a that joins the transmission lug 228a to the main portion 29 of the armature is shown. The depth of the upright portions is so chosen that, when the wiper blade 201 lies on a flat surface, the surfaces of the transmission lugs lying on the same side as that surface tend to intersect the back surface 17 of the flexible strip 7.

Operation of the wiper blade 201 is similar to that in the foregoing embodiments, in that, depending on the curvature of the swept surface, the flexible strip 7 deforms in a plane at right angles to the axis A, and, by virtue of the transmission lugs 228a to 228d, it causes the deflector 222 to become deformed in a plane parallel to the plane of deformation of the flexible strip 7.

Figures 4A, 4B, 4C:
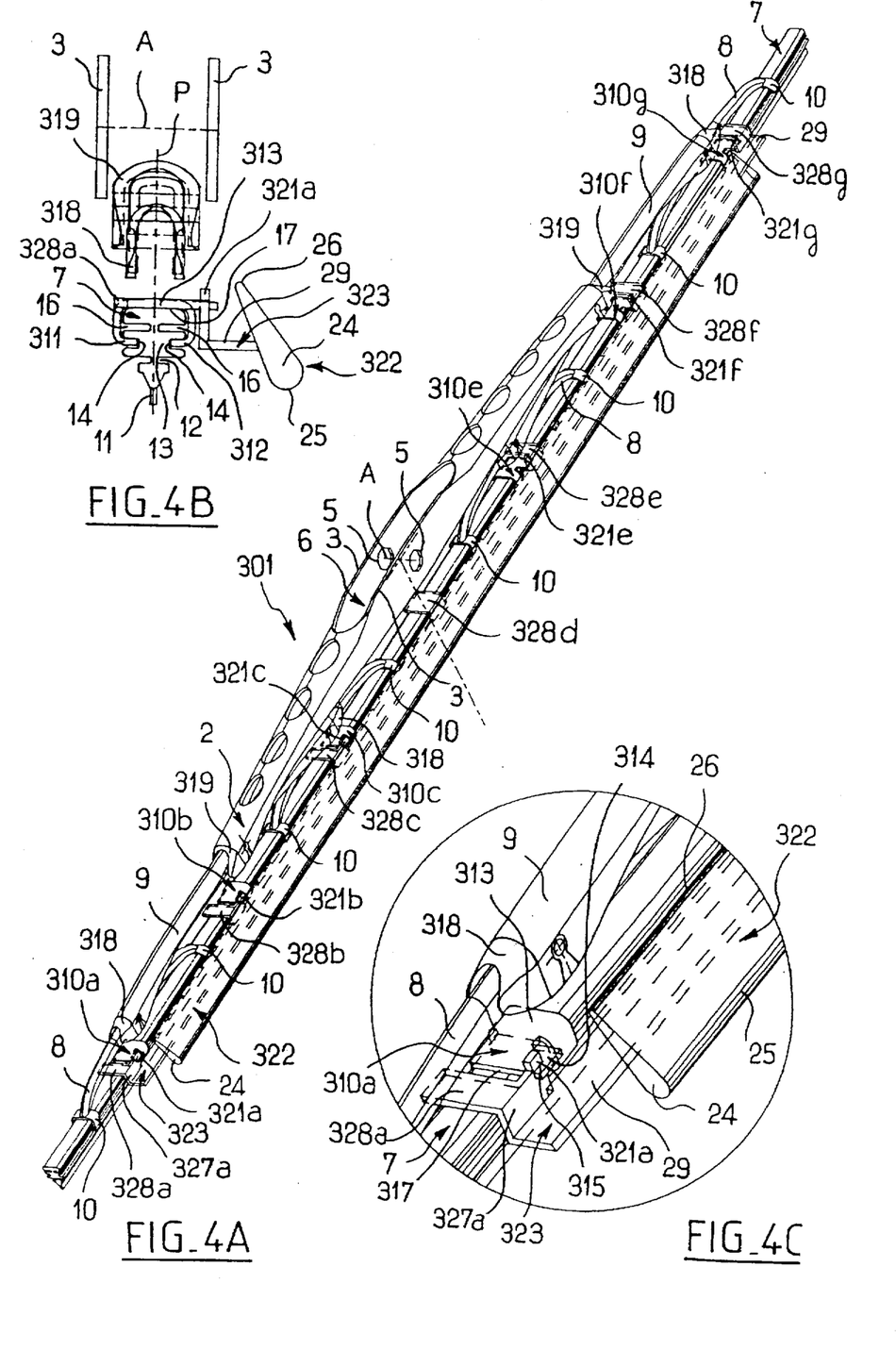
FIG. 4A is a perspective view of a screen wiper blade in a fourth embodiment of the invention.
FIG. 4B is a view of the blade shown in FIG. 4A, viewed endwise and showing, in projection in a transverse plane, the relative positioning of various elements constituting the blade.
FIG. 4C shows certain constructional details of the blade seen in FIGS. 4A and 4B.

Reference is now made to FIGS. 4A to 4C, showing a fourth embodiment of wiper blade according to the invention. FIG. 4A shows this wiper blade at 301. The articulation of the intermediate yokes 9 to the longitudinal ends of the main yoke 2 is obtained by means of articulating members 319 which are generally identical to the articulating members 19a and 19e in the first embodiment, except that guide lugs formed integrally with the articulating members are absent from the members 319. Similarly, the articulating members 318 which provide articulated coupling between the secondary yokes 8 and the intermediate yokes 9 are generally identical to the articulating members 18a, 18c, 18d and 18f described above, except that, again, they do not have integral guide lugs. The deflector 322 of the wiper blade 301 includes an armature 323 of rigid plastics material, having a main portion 29 on which a profiled element 24 of elastomeric material is moulded.

The armature 323 of the deflector 322 has seven transmission lugs for transmission of the deformation from the flexible strip 7 to the deflector 322. These transmission lugs have the respective reference numerals 328a to 328g, in the order in which they lie going from one longitudinal end of the wiper blade 301. The transmission lugs 328a to 328g extend generally parallel to the main axis A and at right angles to the central plane of the blade 301. They are joined to the main portion 29 of the armature 323 by means of upright portions which are oriented at right angles to the axis A. FIG. 4C shows the upright portion 327a that supports the lug 328a. The upright portions are joined to the portion 29 at their lower ends, at right angles to the portion 29 and along the longitudinal edge of the latter which is directed away from the profiled element 24. Each transmission lug 328a to 328g is joined at right angles to the surface of the corresponding upright portion that faces away from the profiled element 24, and at a height such that, when the blade 301 lies on a flat surface, the surface of the transmission lugs lying on the same side as that surface tends to intersect the back surface 17 of the flexible strip 7.

In a plane at right angles to the axis A, the transmission lugs have a constant rectangular cross section. The dimension of the transmission lugs 328a, 328b and 328c, measured parallel to the longitudinal direction of the wiper blade, is smaller than that of the upright portions that carry them. These upright portions are extended upwardly, as is best seen in FIG. 4B, by guide fingers 321a, 321b and 321c respectively. The transmission lug 328d, which lies in substantially vertical alignment with the axis A when the wiper blade is lying on a horizontal flat surface, has no guide finger. The guide fingers 321a to 321c are situated, on those upright portions that carry them, on the side which faces towards the centre of the wiper blade. Similarly, by symmetry, the guide fingers 321e, 321f and 321g, which extend upwardly the upright portions that carry the transmission lugs 328e, 328f and 328g, lie on the side facing towards the centre of the wiper blade.

Arch elements, in which the guide fingers are mounted for sliding movement, are attached on the flexible strip 7. These arch elements, which are associated with the guide fingers 321a, 321b, 321c, 321e, 321f and 321g, are denoted by the reference numerals 310a, 310b, 310c, 310e, 310f and 310g respectively. Like the claws 210a to 210h described earlier herein, these arch elements are formed by a pressing and bending operation. However, by contrast with the claws described above, they are not fixed to the longitudinal ends of the secondary yokes 8, but are simply carried by the flexible wiping strip 7. Thus, the deflector 322 is in fact carried directly by the flexible strip 7.

Each arch element has two side walls 311 and 312 which are curved inwardly towards each other at the bottom, along bending lines parallel to the longitudinal direction of the wiper blade, so as to engage in the grooves 14 of the flexible strip 7. The side walls 311 and 312 are joined together through a flat central region 313 which overlies the back surface 17 of the flexible strip 7. This central region 313 is extended in the longitudinal direction of the wiper blade, on one side of the side walls 311 and 312, and then extends sideways so as to define a guide lug 314 lying in the same plane as the central region 313. Each guide lug 314 is cut out at 315, on its longitudinal edge 317 opposed to the side walls 311 and 312, in order to receive a corresponding guide finger. The arch elements 310a to 310g are disposed on the flexible strip 7 close to the transmission lugs 328a to 328c and 328d to 328f, in such a way that the guide fingers 321a to 321c and 321d to 321g engage in the openings or cut out 315 formed on the longitudinal edges 317 of the guide lugs 314 of the arch elements.

The operation of the blade 301 is similar to that of the blades described in the previous embodiments. As the flexible strip 7 becomes deformed so as to follow the variations in curvature of the windshield, the flexible deflector 322 is deformed in a plane parallel to the plane of deformation of the flexible strip 7.

Reference is now made to FIGS. 5A to 5D showing the fifth embodiment of the invention to be described here, in the form of a wiper blade 401. The blade 401 has a main yoke 402 which is generally similar to the main yoke 2 in the first embodiment, except that the wing element 403 of the main yoke that lies on the same side of the latter as the deflector 422 is extended on its lower edge, in alignment with the main axis A of the blade 401 when the latter lies on a horizontal flat surface, by a tongue which is bent back towards the other wing element of the main yoke, so as to form a guide lug 420d. The purpose of this guide lug 420d is to guide in sliding movement a guide finger of the deflector 422, as is more particularly shown in FIG. 5B.

The intermediate yokes 409 are generally identical to the intermediate yokes 9 of the first embodiment, apart from the fact that the yokes 409 have guide lugs formed integrally with their wing elements and serving to guide the deflector 422 in its deformation. More particularly, the wing element of each intermediate yoke 409 lying on the side away from the deflector 422 is extended, at each longitudinal end and on its lower edge, by a tongue which is bent towards the other wing element, passing below the lower edge of the latter and being extended beyond it, so as to define the guide lug, which guides a guide finger of the deflector in sliding movement. The wing element of each intermediate yoke 409 lying on the same side as the deflector is extended on its lower edge, halfway along the yoke, by a further tongue which is bent towards the deflector 422 so as to define another guide lug, for guiding another guide finger of the deflector in sliding movement. Secondary yokes 8, identical to those previously described, are articulated to the longitudinal ends of the intermediate yokes 409.

The deflector 422 has a rigid armature having a main portion 29 to which there are joined, through upright portions at right angles to the latter, seven transmission lugs for transmitting the deformation from the flexible strip 7 to the deflector 422. These transmission lugs are indicated by the reference numerals 428a to 428g respectively, in the order in which they are located going from one longitudinal end of the wiper blade 401. The transmission lugs extend parallel to the axis A and at right angles to the central plane of the wiper blade 401. Each transmission lug carries, in the middle in the longitudinal direction of the deflector, and close to the upright portion by which it is joined to the main portion 29, a guide finger which extends upwardly at right angles to the plane of the transmission lug. The profile of each of these guide fingers, in cross section in a plane at right angles to the central plane of the wiper blade and parallel to the axis A, is rectangular in form, defining a major side parallel to the longitudinal direction of the wiper blade 401. The guide fingers carry the reference numerals 421a to 421g respectively.

Figures 5A, 5B, 5C, 5D:
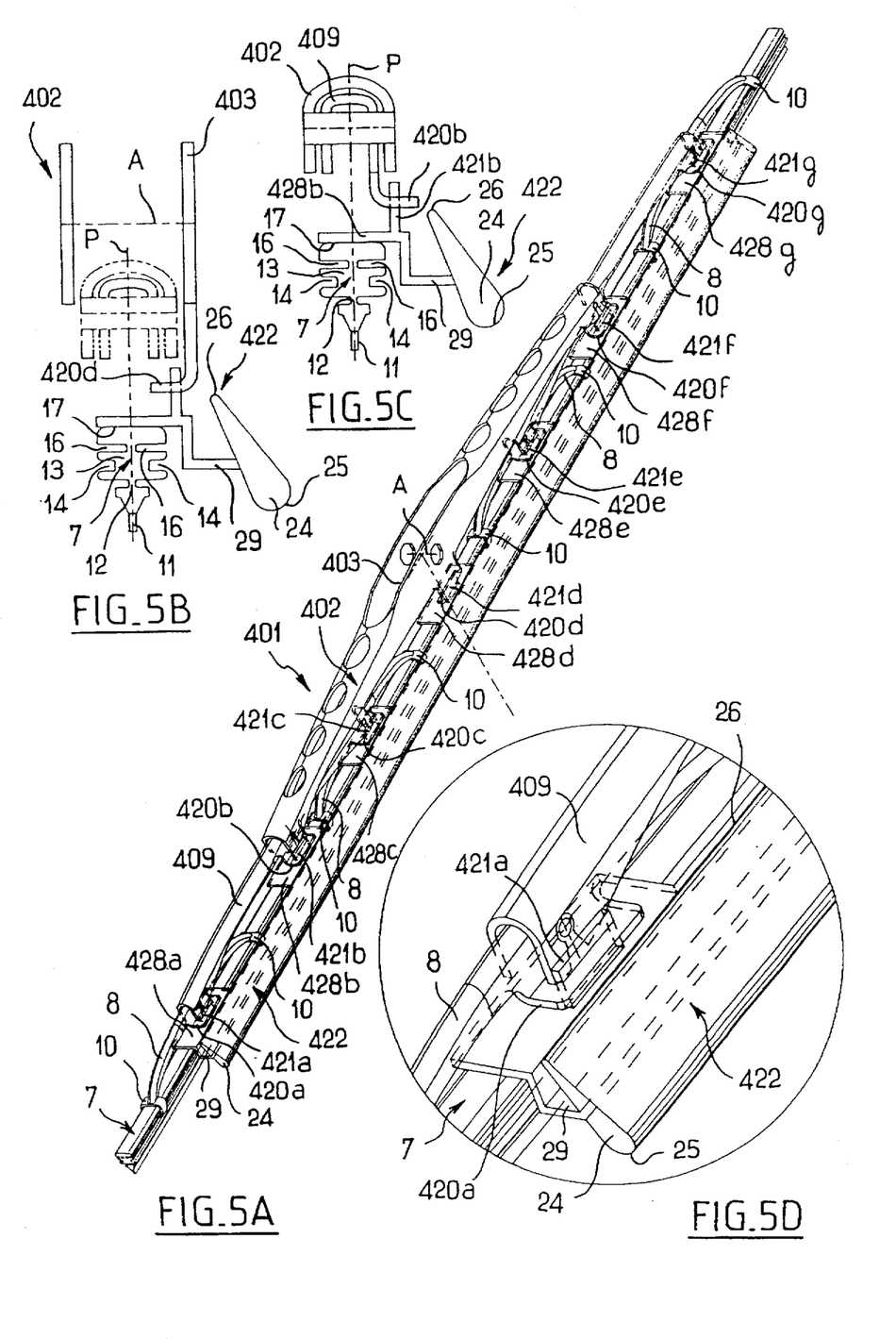
FIG. 5A is a perspective view of a screen wiper blade in a fifth embodiment of the invention.
FIGS. 5B and 5C are two views of the same blade as is shown in FIG. 5A, viewed in the longitudinal direction and showing, in projection in a transverse plane, the relative positioning of various elements that constitute the blade.
FIG. 5D shows certain constructional details of the blade shown in FIGS. 5A to 5C.

The guide lugs formed on the wing elements of the yokes as described above, and formed with openings for guiding the guide fingers 421a to 421g in sliding movement, are given the reference numerals 420a to 420g respectively. The guide lugs 420a and 420c, 420e and 420g are those which are formed, by bending where the yoke is of metal, or by moulding where the yoke is of a plastics material, at the longitudinal ends of the intermediate yokes 409, on the wing elements of these latter which lie away from the deflector 422. The guide lug 420a is shown in FIG. 5D. The guide lugs 420b and 420f are those which are formed on the wall of the intermediate yokes 409 lying on the same side as the deflector 422. The lug 420b can be seen in particular in FIG. 5C. Where possible, it is preferred that a tongue be bent towards the opposite wing element, because this facilitates the bending operation. This is the case for the lugs 421a, 421c, 421e and 421g.

Figures 6A, 6B, 6C, 6D:
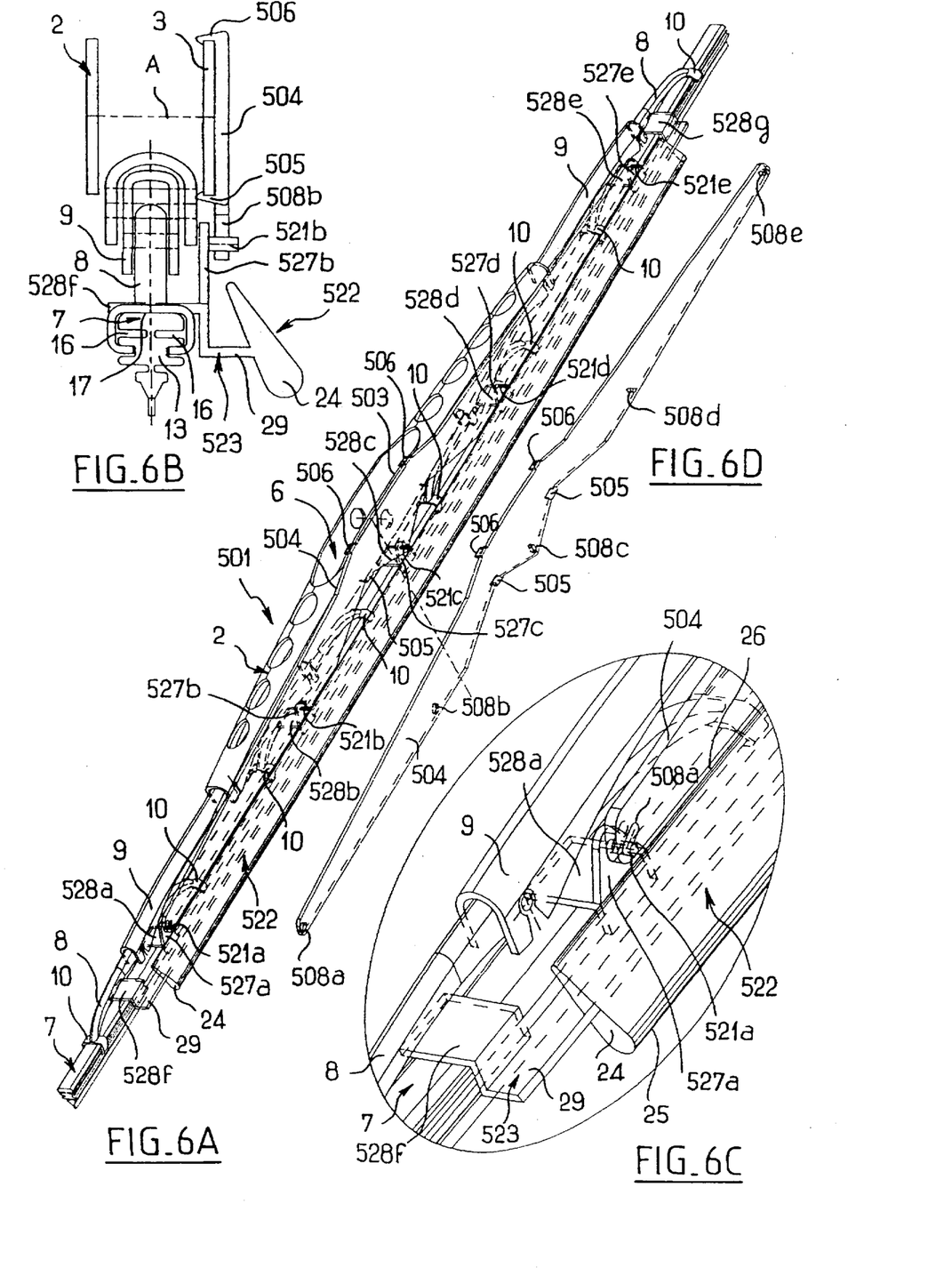
FIG. 6A is a perspective view of a screen wiper blade in a sixth embodiment of the invention.
FIG. 6B is a view of the same blade as is seen in FIG. 6A, viewed endwise and showing, in projection in a transverse plane, the relative positioning of various elements that constitute the blade.
FIG. 6C shows certain constructional details of the blade shown in FIGS. 6A and 6B.
FIG. 6D is a perspective view showing, by itself, a guide plate in a first form which is provided with guide means for the deflector, and which is attached on the main yoke of the blade shown in FIGS. 6A to 6C.
Figures 6E, 6F, 6G:
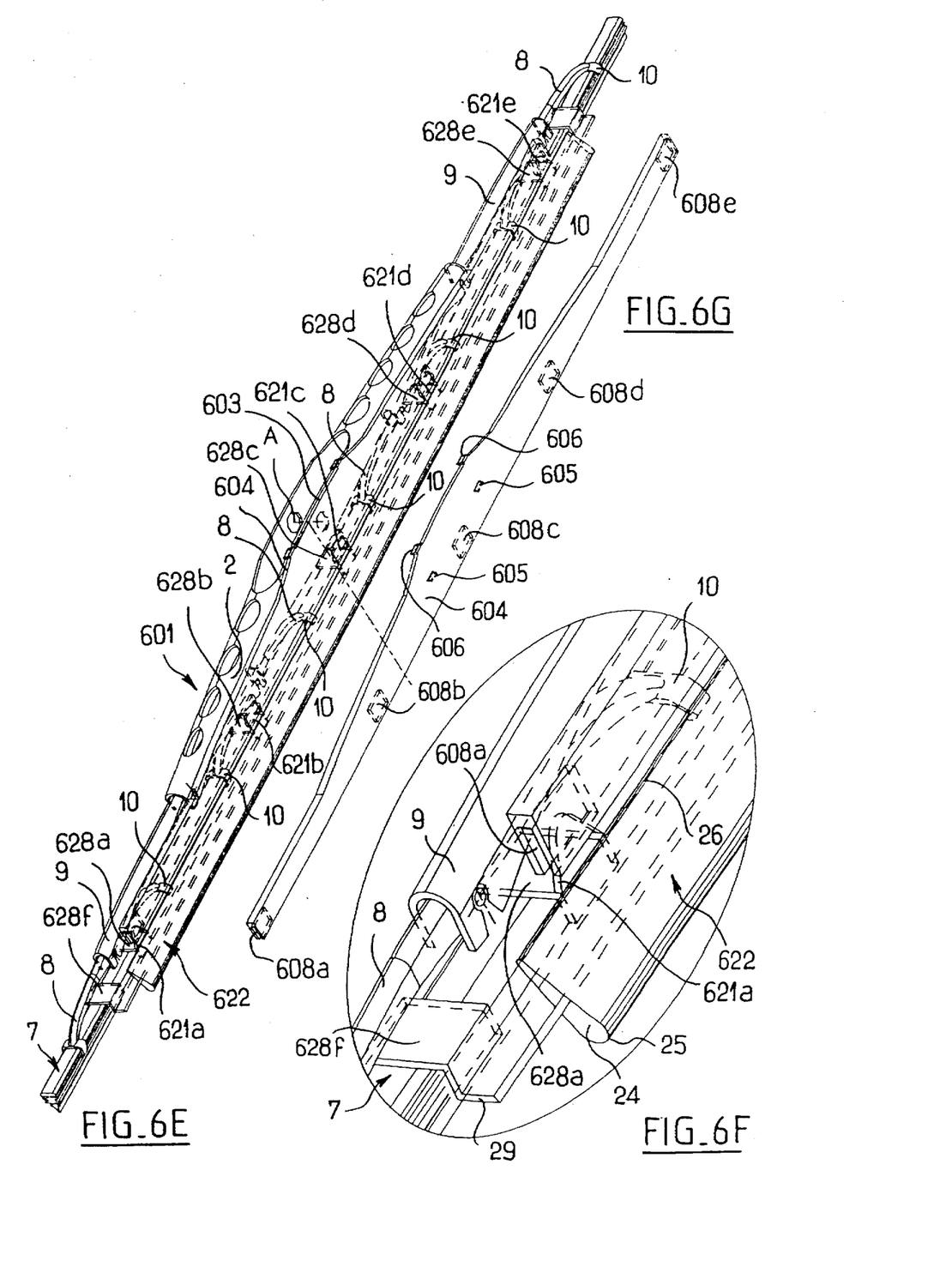
FIG. 6E is a perspective view of a screen wiper blade in a modified form of the sixth embodiment of the invention.
FIG. 6F shows certain constructional details of the blade shown in FIG. 6E.
FIG. 6G is a perspective view showing, by itself, a guide plate in a second form, which is provided with guide means for the deflector, and which is attached on the main yoke of the blade shown in FIGS. 6E and 6F.

Reference is now made to FIGS. 6A and 6E, which show two versions of a screen wiper blade in accordance with a sixth embodiment of the invention. The blade 501 shown in perspective in FIG. 6A comprises a main yoke 2 on which a guide plate 504 is attached. The plate 504 guides the deflector 522 in its deformation in a plane parallel to the plane of deformation of the flexible strip 7.

The guide plate 504 is arranged to be carried on the outer face of that wing element 3 of the main yoke 2 which lies on the same side of the latter as the deflector 522. The plate 504 extends beyond the longitudinal ends of the main yoke 2, so as largely to mask the intermediate yokes 9, up to the vicinity of the longitudinal ends of the yokes 9. This is shown more particularly in FIG. 6C. The guide plate 504 has in its central region a V-shaped profiled portion projecting downwardly and extending below the lower edge of the wing element 3 of the main yoke 2. The guide plate 504 includes, on that one of its surfaces by which is applied on the wing element 3, two pairs 505 and 506 of hooking tongues which, as shown in FIG. 6B, are arranged to be hooked over the lower and upper edges of the wing element 503 in the middle part of the main yoke 2.

Five oblong holes are formed through the thickness of the guide plate 504. These holes have the reference numerals 508a to 508e respectively, in the order in which they appear going from one longitudinal end of the guide plate 504. The hole 508c lies close to the apex of the V-shaped profile mentioned above, below the lower edge of the wing element 3 that carries the guide plate 504. The hole 508c has two straight edges which are parallel to each other and to the central plane of the wiper blade 501, and which are joined at the bottom and at the top through opposed rounded edges. The holes 508b and 508d are symmetrical with each other with respect to the central plane of the wiper blade 501, and each of them has parallel straight edges. The holes 508b and 508d extend obliquely upwardly in FIG. 6A, being convergent with each other. Each of the holes 508b and 508d lies at a point spaced away by about one-sixth of the length of the main yoke 2 from a respective end of the latter, when the guide plate 504 is in place on the main yoke 2. The holes 508a and 508e lie very close to the longitudinal ends of the guide plate 504. Each of the holes 508a and 508e has parallel straight edges. The holes 508a and 508e are inclined by a sharper angle than the holes 508b and 508d, with respect to the direction of the central plane of the wiper blade 501.

The holes 508a to 508e receive pegs 521a to 521e respectively, for guiding the deflector 522 in its deformation in a plane at right angles to the axis A and parallel to the plane of deformation of the flexible strip 7. Each of the pegs 521a to 521e has a cylindrical form defined by a cylinder of revolution about an axis parallel to the axis A, and is joined, at that one of its ends lying on the side remote from the profiled element 24 of the deflector 522, to a respective one of five upright portions 527a to 527e respectively. These upright portions are joined at right angles, at their lower ends, to the main portion 29 of the armature of the deflector 522. The pegs 521a, 521b, 521d and 521e are retained in the respective holes 508a, 508b, 508d and 508e by abutment of the surface of the respective upright portions opposite to the face on which the pegs are engaged, against the outer surface of the wing element of the appropriate yoke lying on the same side as the deflector 522.

Transmission lugs for transmitting deformation from the flexible strip 7 are given the respective reference numerals 528a to 528e, and these are joined on the upright portions 527a to 527e respectively, on the side away from the profiled element 24 and at a height which is so chosen that the lower face of the transmission lugs lies in intersecting relationship with the back surface 17 of the flexible strip 7 (as can be seen in FIG. 6B) when the latter lies on a flat surface. Additional transmission lugs 528f and 528g are formed at the longitudinal ends of the main portion 29 of the armature 523 of the deflector 522.

When the flexible strip 7 is deformed in order to follow changes in the curvature of the windshield, the pegs 521a to 521e are displaced in the oblong holes 508a to 508e, with the deformation of the deflector 522 then taking place under the action of the transmission lugs 528a to 528g.

Fitting of the deflector 522 is carried out by inserting the pegs into the oblong holes in the guide plate 504, and then fitting the assembly on the main yoke 2 until the tongues 505 and 506 become hooked in place.

Figure 6H:
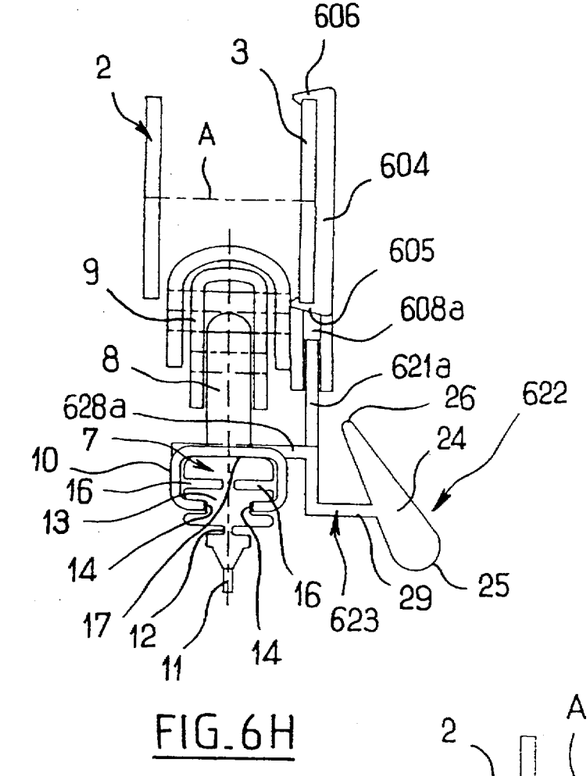
FIG. 6H is a view of the same blade as is shown in FIGS. 6E and 6F, viewed in the longitudinal direction and showing, in projection in a transverse plane, the relative positioning of various elements constituting the blade.

The wiper blade 601 shown in FIG. 6E includes a different form of guide plate, 604. The guide plate 604 is fitted on to one wing element 3 of the main yoke 2. The oblong holes 508a to 508e in the guide plate 504 are replaced in the present case by recesses which have the reference numerals 608a to 608e respectively. These recesses are formed within the thickness of the guide plate 604, and are open on its lower edge. The surface of the guide plate 604 by which the latter is applied on the wing element 3 of the main yoke 2 is provided with two pairs, 605 and 606, of elastic tongues, which are arranged to engage respectively with the lower and upper edges of the wing element 3, in the middle part of the latter, so as to hold the guide plate 604 against the main yoke 2. This is best seen in FIG. 6H.

The rigid armature 623 of the deflector 622 of the wiper blade 601 seen in FIG. 6E has guide fingers, each of which is associated with a respective one of the recesses 608a to 608e, and which are given the reference numerals 621a to 621e respectively. These guide fingers are flat, and extend at right angles to the main axis A, being joined at right angles, at their lower ends, to the main portion 29 of the deflector armature along the longitudinal edge of the latter remote from the profiled element 24 of the deflector. The guide fingers have upper edges which converge towards each other and which are joined at the top through a radius, as can be seen in FIG. 6F. Transmission lugs for transmitting deformation from the flexible strip 7 to the deflector 622 are joined at right angles to the guide lingers, on the side facing away from the profiled element 24. These transmission lugs are given the respective reference numerals 628a to 628e. More precisely, they are joined to the guide fingers at the base of the convergent edges of the latter, at a height which is so chosen that the lower face of the transmission lugs lies in intersecting relationship with the back surface 17 of the flexible strip 7 when the latter lies on a flat surface (see FIG. 6H).

As in the embodiment shown in FIG. 6A, additional transmission lugs 628f and 628g are formed at the longitudinal ends of the main portion 29.

Figure 6I:
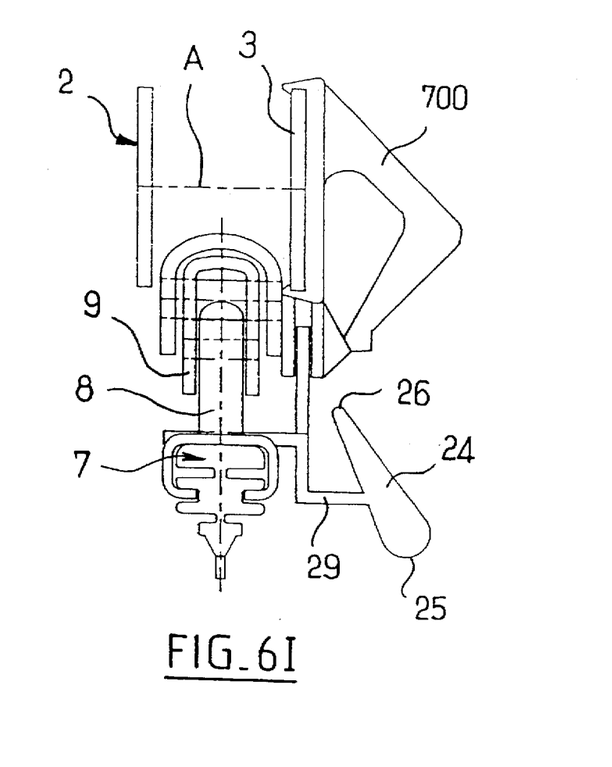
FIG. 6I is a view, seen in the longitudinal direction, of a modified version of a blade in the sixth embodiment of the invention, showing, in projection in a transverse plane, the relative positioning of various elements constituting the blade.

The guide plate which is applied on the main yoke 2 may with advantage also serve as a support for a screen washing nozzle for wetting the windshield, as is illustrated in FIG. 6I. In the modified embodiment shown in that Figure, the guide plate has, on that one of its surfaces which faces away from the main yoke 2, support means 700 for supporting the screen washing nozzle.

Finally, the invention enables a flexible deflector to be guided in its deformation in a plane parallel to the plane of deformation of the flexible wiping strip, without giving rise to the disadvantages of known arrangements. It is not limited to the particular embodiments described herein, which are, moreover, not mutually exclusive. A wiper blade in accordance with the invention can be designed which incorporates various of the guide means taken from more than one of the embodiments described above.

What is claimed is:

1. A screen wiping apparatus for wiping a curved swept surface of a vehicle, said apparatus comprising: an elongate wiper blade defining a first plane and including a support structure, supporting an elongate flexible wiping strip for contact with the swept surface a said strip having a back surface said support structure allowing the flexible strip to generally conform to the curvature of the swept surface whereby to remain in contact with the swept surface curvature; an elongate flexible deflector coupled to said wiper blade, said deflector configured to define a mask for diverting the surrounding air, at high travelling speeds of the vehicle, to cause the air to exert an aerodynamic force to urge the flexible strip into contact with the swept surface; and mounting means mounting the deflector on the wiper blade, the mounting means including means coupling the deflector with the flexible strip whereby the deflector can undergo deformation under control of the flexible strip, wherein the coupling means include deformation transmitting means disposed in at least three points along the length of the wiper blade, for transmitting deformations of the wiping strip to the deflector so that deformations of the wiping strip are reproduced in the deflector, the apparatus including first guide means carried by the blade and located in a plurality of points along the length of the wiper blade, and second guide means carried by the deflector for sliding cooperation with the first guide means to guide the deformation of the deflector, an armature extending along the length of the wiper blade and having a longitudinal edge therealong, the elongate flexible deflector carried by the armature at said edge to extend along the longitudinal edge in isolation from the support structure, said deformation transmitting means and said second guide means extending from said armature, the armature protruding from the elongate flexible deflector and toward the wiping strip back surface.

2. Apparatus according to claim 1, wherein the first and second guide means define a second plane and are adapted to guide the deformation of the deflector in the second plane.

3. Apparatus according to claim 1, wherein the reflector comprises a profiled element, the deformation transmitting means having a plurality of transmission lugs carried by the armature and configured to be displaced in conformity with displacement of the flexible strip.

4. Apparatus according to claim 3, wherein the said second guide means comprise a plurality of guide fingers projecting from the armature of the deflector and extending transversely with respect to the deflector, with at least one said guide finger being joined to the remainder of the armature in the vicinity of a said transmission lug.

5. Apparatus according to claim 1, wherein the second guide means comprise a plurality of guide fingers projecting from the armature and extending transversely with respect to the deflector to guide the deformation of the deflector.

6. Apparatus according to claim 5, wherein the first guide means comprise a plurality of guide lugs, at least one of which has a recess formed therein, said at least one guide lug receiving a guide finger for sliding movement of the guide finger in the recess.

7. Apparatus according to claim 1, wherein the support structure comprises a main yoke defining a plurality of pivot axes, a plurality of secondary yokes, and means articulating the secondary yokes to the main yoke for movement of each secondary yoke about a corresponding one of the pivot axes, each of said yokes having respective longitudinal ends, at least two of the secondary yokes having support means carrying the flexible strip, the support structure defining said first plane in which the flexible strip is deformable, and the first plane being perpendicular to the pivot axes.

8. Apparatus according to claim 7, having four secondary yokes, the means articulating the secondary yokes to the main yoke comprising: two intermediate yokes, the intermediate yokes each having respective longitudinal ends; means articulating each intermediate yoke, at the center of each of the intermediate yokes to a respective one of the longitudinal ends of the main yoke; and means articulating each secondary yoke at its center to a respective one of the longitudinal ends of a corresponding intermediate yoke.

9. Apparatus according to claim 7, wherein the articulating means comprise pivot pins coupling one yoke pivotally to another, and an insert associated with at least one said pivot pin and having an upper portion for engagement on the corresponding pivot pin and a lower portion extending laterally towards the deflector so as to constitute the said first guide means.

10. Apparatus according to claim 7, wherein the support means of the secondary yokes, for carrying the flexible strip, comprise claws at the longitudinal ends of the secondary yokes, each said claw having a portion extending laterally towards the deflector so as to define the said first guide means.

11. Apparatus according to claim 1, wherein the said flexible strip carries a plurality of guide lugs extending laterally towards the deflector so as to define the said first guide means.

12. Apparatus according to claim 11, wherein the deformation transmission means comprise a plurality of transmission lugs, the apparatus further including a plurality of arch elements each of which is attached on the said flexible strip close to a respective said transmission lug, the said guide lugs being carried by the arch elements.

13. Apparatus according to claim 1, wherein the second guide means comprise guide fingers, the first guide means having a plurality of guide lugs defining openings for guiding the guide fingers therein in straight line movement.

14. Apparatus according to claim 1, wherein the said first guide means comprise a guide plate of plastics material and carried on the wiper blade, the guide plate extending generally parallel to said first plane.

15. Apparatus according to claim 14, wherein the guide plate has a plurality of oblong holes the second guide means comprising a plurality of pegs carried by the said armature, the support structure defining a main pivot axis of the wiper blade at right angles to said first plane, said pegs being parallel to said main axis, with the pegs being received in said oblong holes in the guide plate for displacement of the pegs therein.

16. Apparatus according to claim 14, wherein the guide plate has recesses formed within its thickness and defining the said first guide means.

17. Apparatus according to claim 14, wherein the guide plate further includes support means for at least one spray nozzle.

18. A screen wiping apparatus for wiping a curved swept surface of a vehicle, said apparatus comprising: an elongate wiper blade defining a first plane and including a support structure supporting an elongate flexible wiping strip for contact with the swept surface said support structure allowing the flexible strip to generally conform to the curvature of the swept surface whereby to remain in contact with the swept surface curvature; an elongate flexible deflector coupled to said wiper blade, said deflector, configured to define a mask for diverting the surrounding air, at high travelling speeds of the vehicle, to cause the air to exert an aerodynamic force to urge the flexible strip into contact with the swept surface; and mounting means mounting the deflector on the wiper blade, the mounting means including means coupling the deflector with the flexible strip whereby the deflector can undergo deformation under control of the flexible strip, wherein the coupling means include deformation transmitting means disposed in at least three points along the length of the wiper blade, for transmitting deformations of the wiping strip to the deflector so that deformations of the wiping strip are reproduced in the deflector, the apparatus including first guide means carried by the blade and located in a plurality of points along the length of the wiper blade, and second guide means carried by the deflector for sliding cooperation with the first guide means to guide the deformation of the deflector, wherein the second guide means have an elongated armature coupled with the deflector and extending generally parallel to the flexible wiping strip, a plurality of guide fingers projecting from the armature of the deflector and extending transversely with respect to the deflector to guide the deformation of the deflector and, wherein each said guide finger is flat.

19. A screen wiping apparatus for wiping a curved swept surface of a vehicle, said apparatus comprising: an elongate wiper blade defining a plane and including a support structure supporting an elongate flexible wiping strip for contact with the swept surface, said support structure allowing the flexible strip to generally conform to the curvature of the swept surface whereby to remain in contact with the swept surface curvature; an elongate flexible deflector coupled to said wiper blade, said deflector, configured to define a mask for diverting the surrounding air, at high travelling speeds of the vehicle, to cause the air to exert an aerodynamic force to urge the flexible strip into contact with the swept surface; and mounting means mounting the deflector on the wiper blade, the mounting means including means coupling the deflector with the flexible strip whereby the deflector can undergo deformation under control of the flexible strip, wherein the coupling means include deformation transmitting means disposed in at least three points along the length of the wiper blade, for transmitting deformations of the wiping strip to the deflector so that deformations of the wiping strip are reproduced in the deflector, the apparatus including first guide means carried by the blade and located in a plurality of points along the length of the wiper blade, and second guide means carried by the deflector for sliding cooperation with the first guide means to guide the deformation of the deflector, wherein the support structure has a main yoke defining a plurality of pivot axes, a plurality of secondary yokes, and means articulating the secondary yokes to the main yoke for movement of each secondary yoke about a corresponding one of the pivot axes, each of the yokes having respective longitudinal ends, at least two of the secondary yokes having support means carrying the flexible strip, the support structure defining said plane in which the flexible strip is deformable, and the plane being perpendicular to the pivot axes and, wherein the articulating means include articulating members attached on the longitudinal ends of at least one of the yokes and including integral guide lugs extending laterally towards the deflector to constitute the first guide means.

\* \* \* \* \*